(12) United States Patent
Kume (10) Patent No.: US 7,065,775 B2
(45) Date of Patent: Jun. 20, 2006

(54) OPTICAL DISC APPARATUS

(75) Inventor: Hideki Kume, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 559 days.

(21) Appl. No.: 10/609,629

(22) Filed: Jul. 1, 2003

(65) Prior Publication Data

US 2004/0004929 A1    Jan. 8, 2004

(30) Foreign Application Priority Data

Jul. 8, 2002    (JP)    ............... 2002-004171 U (51) Int. Cl.
*G11B 17/00* (2006.01)
(52) U.S. Cl. .................................................. 720/691
(58) Field of Classification Search ............... 720/691
See application file for complete search history.

(56) References Cited

U.S. PATENT DOCUMENTS 5,008,873 A * 4/1991 Tanaka et al. ........... 369/44.14
6,493,309 B1   12/2002 Sogawa et al.
6,948,178 B1 * 9/2005 Inatani et al. ............ 720/675

FOREIGN PATENT DOCUMENTS

| JP | 9-21937    | 1/1997 |
| JP | 11-232653  | 8/1999 |
| JP | 2002-15433 | 1/2001 |
| JP | 2002-15434 | 1/2002 |

* cited by examiner

*Primary Examiner*—Angel Castro
(74) *Attorney, Agent, or Firm*—Morgan, Lewis & Bockius LLP (57) ABSTRACT

In an optical disc apparatus, a lens holding body provided with an objective lens is mounted on a base body. The base body has a screw hole and is guided by a guide shaft. An adjusting screw screwed into the screw hole has a slidable portion formed by an annular groove portion and slidably fitting with a rail portion on a chassis side. Each screw thread of a male screw of the adjusting screw is divided into two half sections along the peripheral direction thereof in a manner that a screw thread as one side section and a screw thread as the other side section are slightly deviated positionally to each other in the axial line direction. The screw threads are made in contact with the two slanted surfaces of a female screw.

7 Claims, 6 Drawing Sheets

OPTICAL DISC APPARATUS

BACKGROUND OF THE INVENTION

1. Field of the Invention

The present invention relates to an optical disc apparatus having a function of recording a signal on and reproducing a signal from a disc such as a compact disc (CD), a mini disc (MD) and a digital versatile disc (DVD), and particularly relates to an optical disc apparatus which is arranged to adjust by rotating a screw the inclination angle of an objective lens that scans the surface of the disc.

2. Description of the Related Art

Figure 6:
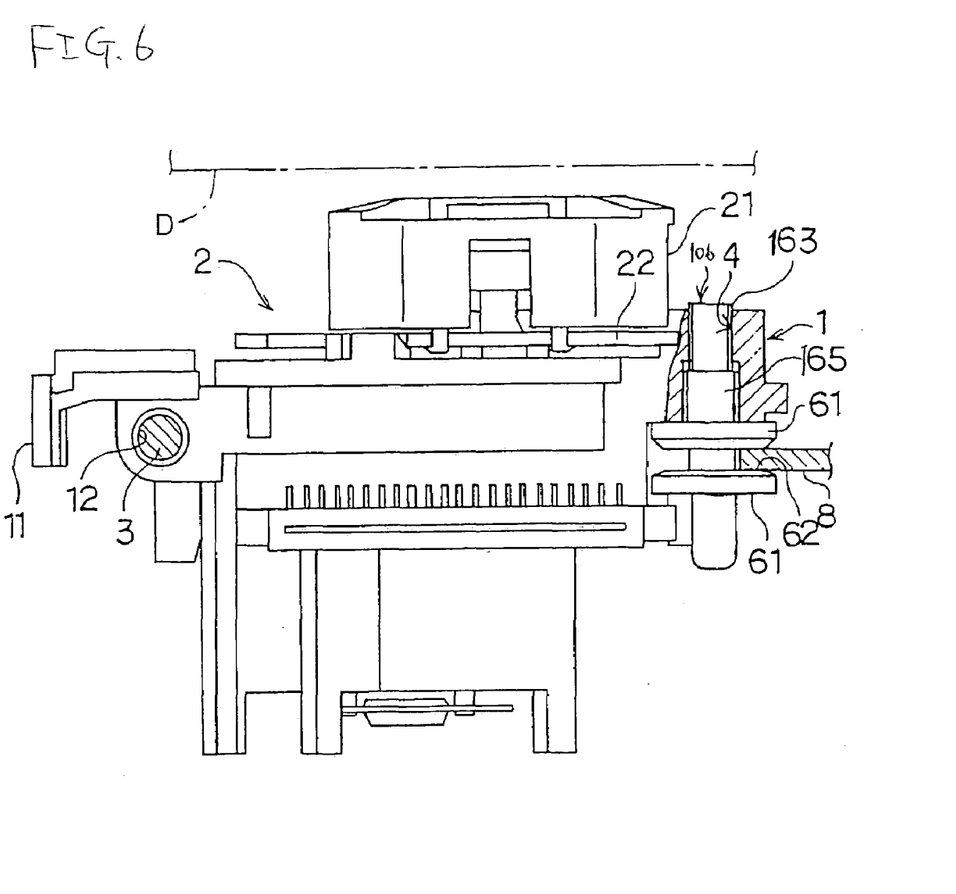
FIG. 6 is a partially sectional front view of an optical pickup unit provided in a conventional optical disc apparatus.

A conventional optical disc apparatus will be described with reference to FIG. 6. The optical disc apparatus includes an optical pickup unit shown in FIG. 6. The optical pickup unit exemplarily shown in FIG. 6 is arranged in a manner that a lens holding member 2 attached with a hood-shaped cover 21 is mounted on a base body 1 provided with a rack 11 serving as an input portion for a driving force. In the lens holding member 2, the cover 21 is attached on a frame 22 fixed on the base body to adjust an inclination angle. The cover 21 surrounds the periphery of the lens holding member having an objective lens and held by the frame 22 (the lens holding member having the objective lens is not shown in FIG. 6). The base body 1 is provided with a guide hole 12 and a screw hole 4 at the both sides sandwiching the lens holding member disposing position A rod-shaped guide shaft 3 fits in the guide hole 12 in a relatively slidable and rotatable manner. An adjusting screw 106 is screwed into a screw hole 4. The adjusting screw 106 is provided with a concentric slidable portion 62 configured by an annular groove portion formed by a pair of flanges 61, 61. The slidable portion 62 fits with a rail portion 8 extending in parallel to the guide shaft 3 so that the slidable portion is slidable along the rail portion. The rail portion 8 is integrally formed with a not-shown chassis (drive chassis) formed by synthetic resin molding. The guide shaft 3 is attached to the chassis.

In the optical disc apparatus provided with the optical pickup unit shown in FIG. 6, when a driving force is applied to the optical pickup unit through the rack 11, the base body 1 on which the lens holding member 2 is mounted is guided along the guide shaft 3 and reciprocally moved along a disc surface D shown by an dashed line in the radial direction thereof. According to this moving operation, a laser beam passed through the objective lens is irradiated on the disc surface D.

In the optical pickup unit shown in FIG. 6, the frame 22 of the lens holding member 2 is fixed to the base body 1 after suitably adjusting the inclination angle of the objective lens of the lens holding member. When only such an adjustment of the inclination angle is performed, the posture of the base body 1 may vary depending on the variation of the relative positional relation between the rail portion 8 and the guide shaft 3 supporting the base body 1. Thus, the optical pickup unit is arranged in a manner that the inclination angle of the objective lens can also be adjusted by changing the posture of the base body 1. Such an adjustment of the inclination angle is performed by rotating the adjusting screw 106.

That is, since the height level of the slidable portion 62 fitting with the rail portion 8 is constant, when the adjusting screw 106 screwed into the screw hole 4 is rotated in a positive direction or a reverse direction, the base body 1 swings upward or downward with respect to the slidable portion 62 around the axis line of the guide shaft 3, whereby the posture of the base body 1 changes. As a result, the inclination angle of the objective lens of the lens holder provided in the lens holding member 2 is adjusted.

Figure 5:
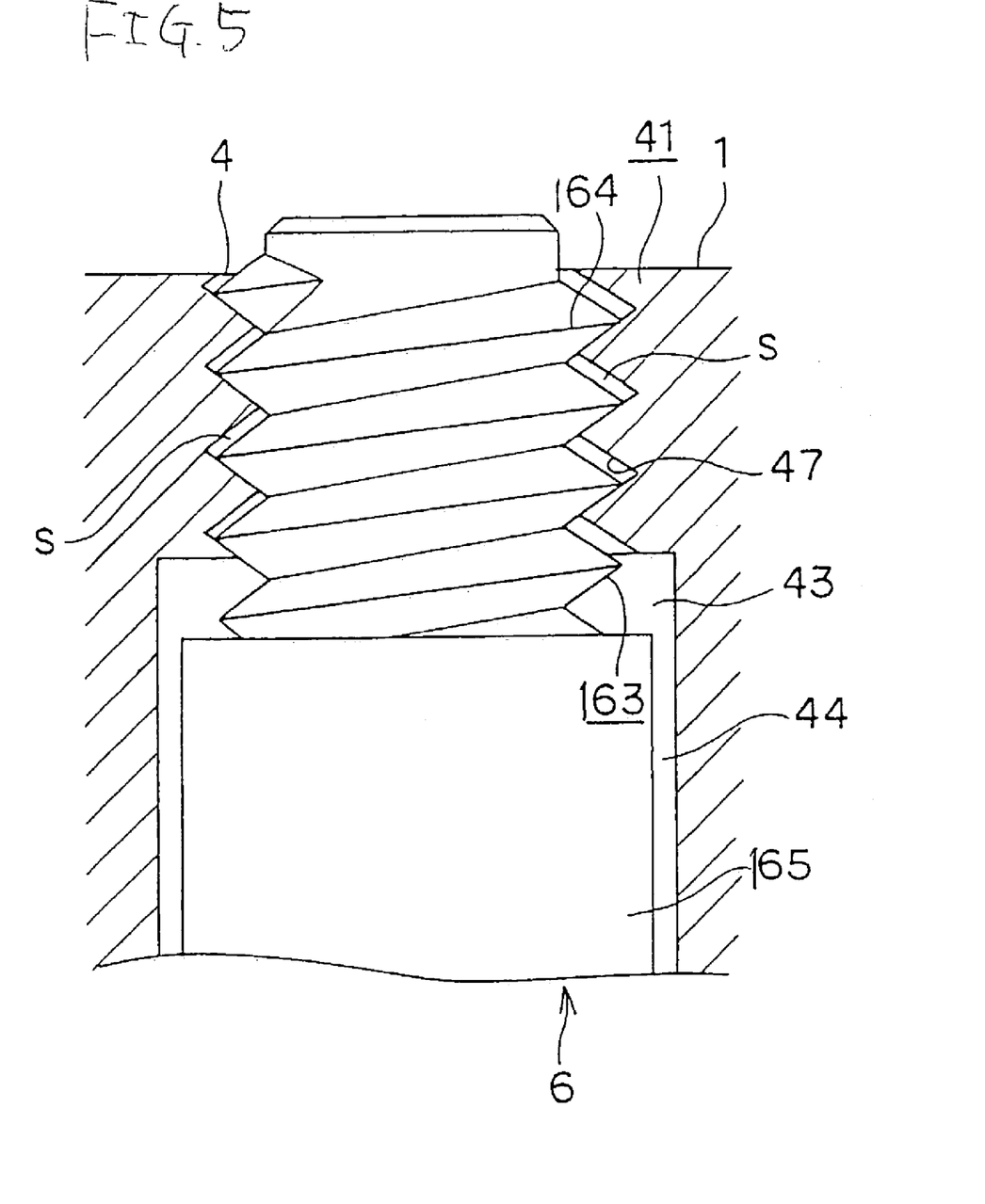
FIG. 5 is an enlarged diagram showing an engaged state between the main portion of an adjusting screw and a screw hole provided in a base body side in a conventional optical pickup unit.

FIG. 5 is an enlarged diagram showing an engaged state between a main portion of the adjusting screw 106 employed in the conventional optical pickup unit and the screw hole 4 provided in the base body 1.

The size and the shape of a male screw 163 of the adjusting screw 106 and a female screw 41 of the screw hole 4 shown in this figure are conform to JIS standard. The male screw 163 is formed by a single spiral-shaped screw thread 164 extending smoothly and continuously, whilst the female screw 41 is formed by a single spiral-shaped valley-shaped groove 47 extending continuously. In a state where the male screw 163 is screwed into the female screw 41, a gap S is defined between the male screw 163 and the female screw 41 as shown in this figure. This gap S serves to improve the operability at the time of screwing the adjusting screw 106 into the screw hole 4. The adjusting screw 106 is integrally formed by synthetic resin together with the pair of flanges 61 shown in FIG. 6 and a tool engaging portion (not shown). The adjustment screw further includes a shaft portion 165 having a circular section which is adjacent to the forming portion of the male screw 163. When the male screw 163 is screwed into the female screw 41, the shaft portion 165 is fit into a no-thread hole portion 43 provided adjacent to the screw hole 4 in a manner that a slight gap 44 is defined therebetween.

JP-A-11-232653 (prior art 1) shows an example in which a convex portion provided with a sphere surface is formed on a lens attachment plate at which an objective lens is held, the convex portion is overlapped on a concave portion having a sphere surface of a base table, and bolts are inserted into through holes disposed at the both sides sandwiching the concave portion of the base table, respectively. These bolts are respectively screwed into the screw holes of the lens attachment plate and one of these bolts is urged downward by a compression spring thereby to attach the lens attachment plate to the base table. In this example, when one of the bolts inserted into the through holes is rotated, the convex portion slides with the concave portion to change the lens attachment portion thereby to adjust the inclination angle of the objective lens held by the lens attachment plate.

JP-A-9-21937 (prior art 2) relates to an optical element positioning fixing apparatus and describes that the position of a prism holder is adjusted in a state where the prism holder on which a prism serving as an optical element is mounted is provisionally fixed to a base member by means of a single fixing screw so as to be movable in the horizontal direction, and thereafter the prism is fixed to the base member by using plural fixing screws.

JP-A-2002-15434 (prior art 3) and JP-A-2002-15433 (prior art 4) disclose that the inclination angle of an objective lens of an optical pickup is adjusted by adjusting the inclination of a guide shaft for guiding the movement of the optical pickup of a disc apparatus, by using a spring member and an adjusting screw.

Each of the bolt of the prior art 1, the fixing screw of the prior art 2 and the adjusting screws of the prior art 3 and the prior art 4 is assumed to be arranged in a manner that a male screw having a single spiral-shaped thread extending smoothly and continuously is screwed into the female screw of a screw hole serving as a partner side screw.

As described with reference to FIG. 5, according to the conventional optical disc apparatus, each of the screw thread 164 of the male screw 163 of the adjusting screw 106 and the valley-shaped groove 47 of the female screw 41 of the screw hole 4 is extending smoothly and continuously. Since the gap S is defined between the male screw 163 and the female screw 41 engaged to each other, the adjusting screw 106 may be rotated unexpectedly. For example, at the time of moving the base body 1 in the disc radial direction, when the slidable portion 62 (see FIG. 6) disposed on the adjusting screw 106 rubs with the rail portion 8 of the chassis and so rotation moment is applied to the adjusting screw 106, the adjusting screw 106 rotates unexpectedly due to the rotation moment. Further, when various kinds of vibration is applied to the adjusting screw 106, the adjusting screw 106 also rotates unexpectedly due to the vibration. When the adjusting screw 106 rotates unexpectedly in this manner, the base body 1 swings upward or downward around the axis line of the guide shaft 3 by an amount corresponding to the rotation amount of the adjusting screw 106. Thus, there arises a phenomenon that the inclination angle of the objective lens deviates and so the recording or reproducing efficiency may be degraded due to such a deviation. In order to prevent such a phenomenon, there has been employed a method that the adjusting screw 106 is fixed to the base body 1 by means of adhesive after adjusting the inclination angle by using the adjusting screw 106. However, even when such a method is employed, there may arise a matter that the adhesive is peeled off due to any cause and so the adjusting screw 106 rotates unexpectedly as described above.

In this respect, the aforesaid prior arts 1, 3 and 4 are arranged in a manner that each of the bolt of the prior art 1 and the adjusting screws of the prior arts 3, 4 is applied with a spring pressure thereby to prevent the unexpected rotation of the adjusting screw. However, according to such an arrangement, a coil spring or a leaf spring for generating the spring pressure is additionally required, whereby the number of the parts increases and so the assembling operability is degraded and further the cost increases.

SUMMARY OF THE INVENTION

The invention has been made in order to improve the aforesaid circumstances of the conventional technique. An object of the invention is to prevent an adjustment screw from unexpectedly rotating to cause a deviation of the angle after the inclination angle of an objective lens is adjusted by rotating the adjusting screw in an optical disc apparatus by contriving the configuration of the adjusting screw.

The optical disc apparatus according to the invention is similar to the conventional optical disc apparatus in a point that a lens holding member provided with an objective lens opposing to the surface of a disc is mounted on a base body which is reciprocally moved in the radial direction of the disc, and the adjustment of an inclination angle of the objective lens is performed by rotating an adjusting screw which is screwed into a screw hole provided in the base body.

In the invention, a male screw of the adjusting screw is divided into two sections along a peripheral direction thereof in a manner that a screw thread as one side section and a screw thread as the other side section are slightly deviated positionally to each other in an axial line direction, and a tip portion of the screw thread of the one side section elastically presses against one slanted surface of two slanted surfaces, which couple a valley bottom portion of a female screw of the screw hole with adjacent tip portions of the female screw, and a tip portion of the screw thread of the other side section elastically presses against the other slanted surface of the two slanted surfaces.

According to such a configuration, there arises no wobble in the axial direction between the male screw of the adjusting screw and the female screw of the screw hole. Further, the frictional resistance due to the contact between the screw thread of the one side section of the male screw and the one side slanted surface of the female screw and the frictional resistance due to the contact between the screw thread of the other side section of the male screw and the other side slanted surface of the female screw serves to prevent the unexpected rotation of the adjusting screw.

In the invention, it is preferable that each screw thread is divided into two half sections along the peripheral direction thereof. According to this configuration, the frictional resistance due to the contact between the screw thread of the one side section of the male screw and the one side slanted surface of the female screw is always balanced with the frictional resistance due to the contact between the screw thread of the other side section of the male screw and the other side slanted surface of the female screw, so that the operability of the rotation at the time of adjusting the inclination using the adjusting screw is not degraded.

In the invention, it is preferable that the adjusting screw is formed by synthetic resin molding. Such an adjusting screw can be manufactured easily which is provided with the male screw configured in a manner that the screw thread of the one side section and the screw thread of the other side section are deviated to each other in the axial line direction.

In the invention, it is preferable to employ such a configuration that a tip angle of the screw thread of the male screw of the adjusting screw is made smaller than an open angle between the two slanted surfaces, and the tip portion of the screw thread of the one side section elastically presses against one side slanted surface of the two slanted surfaces and the tip portion of the screw thread of the other side section elastically presses against the other side slanted surface of the two slanted surfaces. Since the tip portions of the screw threads of the one side section and the other side section elastically press against the one side slanted surface and the other side slanted surface in an almost line contact state, respectively, unexpected rotation of the adjusting screw can be prevented without degrading the rotation operability of the adjusting screw.

In the invention, preferably, the screw hole is provided with a receiving surface formed by a cylindrical surface, and a plurality of projections are provided at plural portions of the adjusting screw along the peripheral direction thereof so that the projections elastically press against the receiving surface to prevent rotation of the adjusting screw. Thus, in addition to the aforesaid rotation prevention effect of the adjusting screw due to the contact between the screw threads of the male screw and the slanted surfaces of the female screw, such a rotation prevention effect due to the elastic pressing of the projections against the receiving surface acts interactively, so that the unexpected rotation of the adjusting screw can be further surely prevented.

The invention can employ such a configuration that the base body is attached to a guide shaft in a relatively slidable and rotatable manner, the guide shaft being attached to a chassis for guiding reciprocal movements of the base body, the screw hole is positioned away from the guide shaft, and a slidable portion is provided on the adjusting screw in a manner that the slidable portion is supported so as to be slidable by a rail portion which is provided in the chassis in parallel to the guide shaft. According to such a configuration, the base body swings upward or downward with respect to the slidable portion by rotating the adjusting screw thereby to perform the adjustment of the inclination angle of the objective lens.

According to the invention, there is further provided an optical disc apparatus including: a guide shaft attached to a chassis; a base body being guided by the guide shaft to reciprocally move along a radial direction of the disc, the base body having a screw hole positioned away from the guide shaft; a lens holding member mounted on the base body and having an objective lens that opposes to a surface of a disc; an adjusting screw made of synthetic resin and having a male screw and a slidable portion concentrically formed by an annular groove portion; and a rail portion fitting with the slidable portion and provided in the chassis in parallel to the guide shaft, wherein the base body swings around an axis line of the guide shaft to perform adjustment of an inclination angle of the objective lens when the adjusting screw being screwed into the screw hole is rotated, the male screw of the adjusting screw is divided into two half sections along a peripheral direction thereof in a manner that a screw thread as one side section and a screw thread as the other side section are slightly deviated positionally to each other in an axial line direction, a tip angle of the screw thread is made smaller than an open angle between two slanted surfaces which couple a valley bottom portion of a female screw of the screw hole with adjacent tip portions of the female screw, and a tip portion of the screw thread of the one side section elastically presses against one side slanted surface of the two slanted surfaces and a tip portion of the screw thread of the other side section elastically presses against the other side slanted surface of the two slanted surfaces. The effects of the invention will be clarified by the embodiments explained below.

DETAILED DESCRIPTION OF THE PREFFERED EMBODIMENTS

Figure 1A:
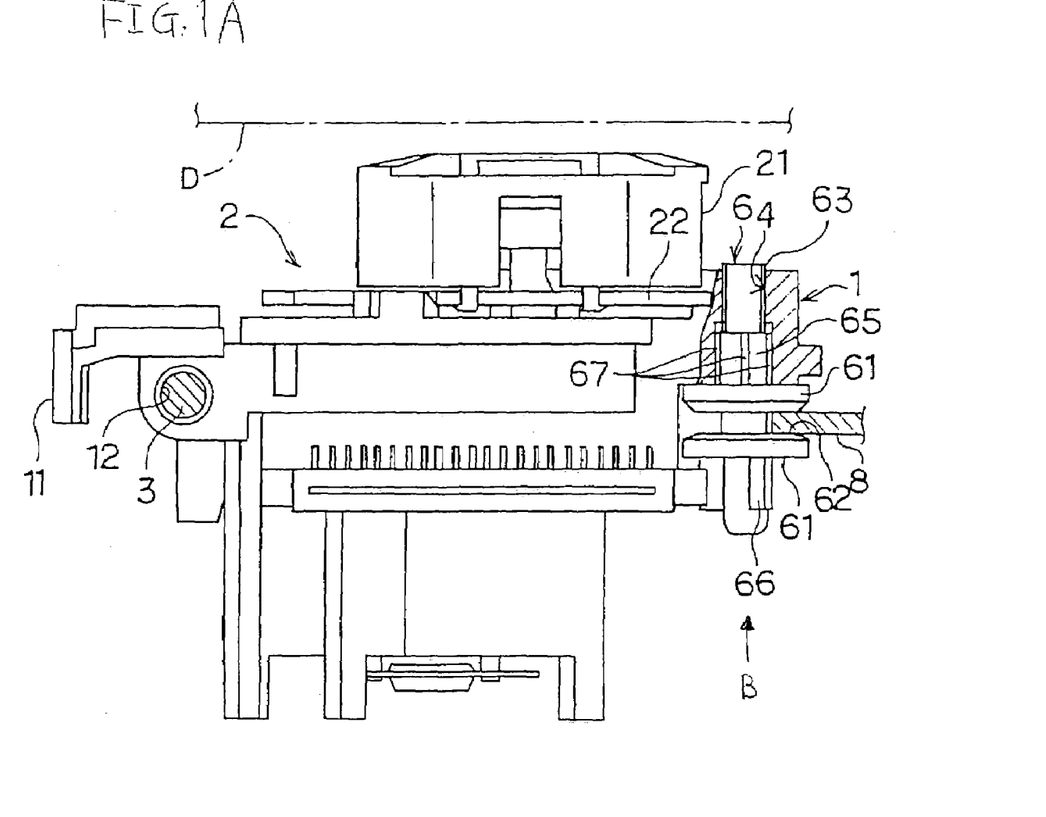
FIG. 1A is a partially sectional front view of an optical pickup unit provided in an optical disc apparatus according to an embodiment of the invention.
Figure 2:
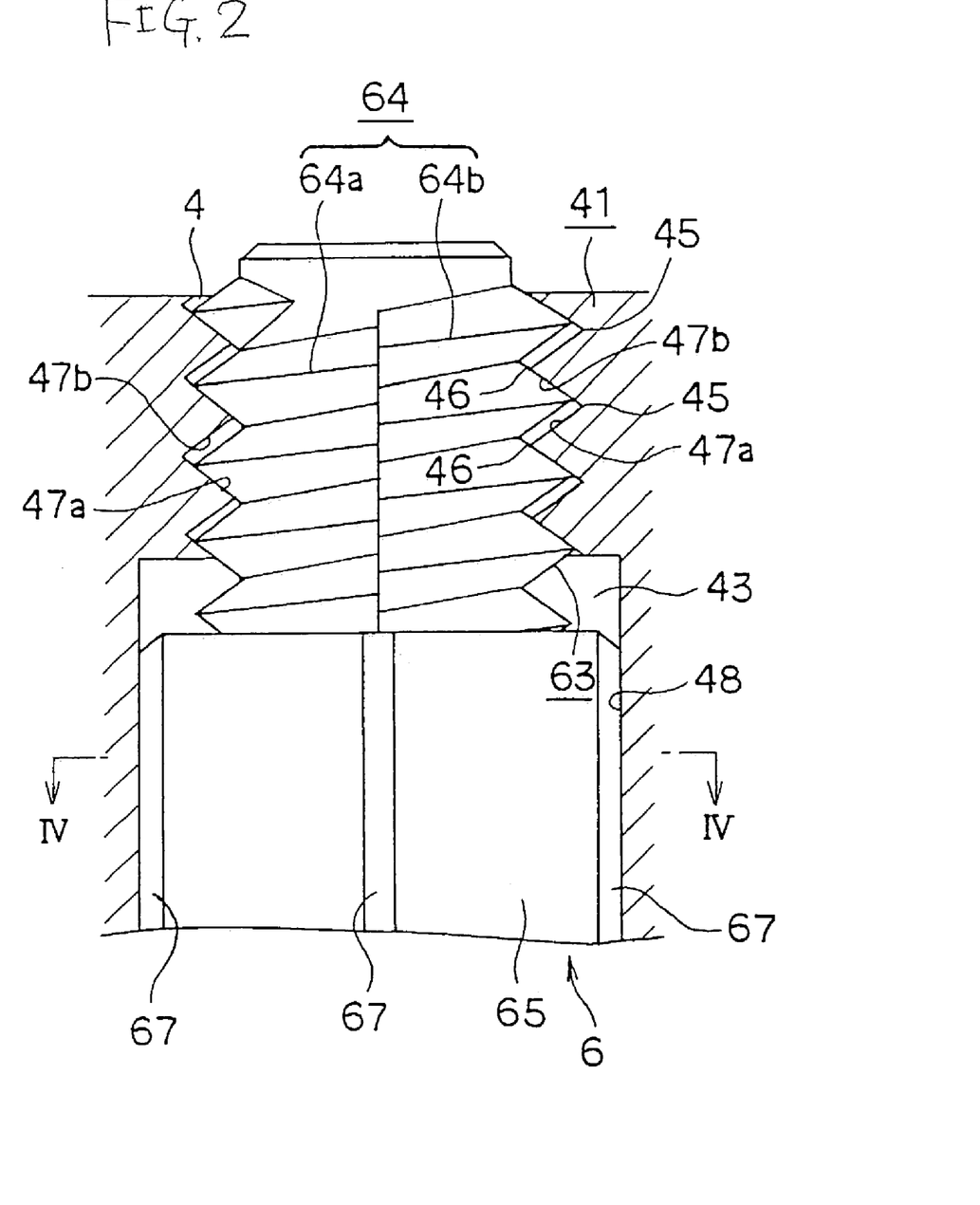
FIG. 2 is an enlarged explanatory diagram showing an engagement state between the main portion of an adjusting screw 6 and the screw hole 4 on a base body 1 side.
Figure 3:
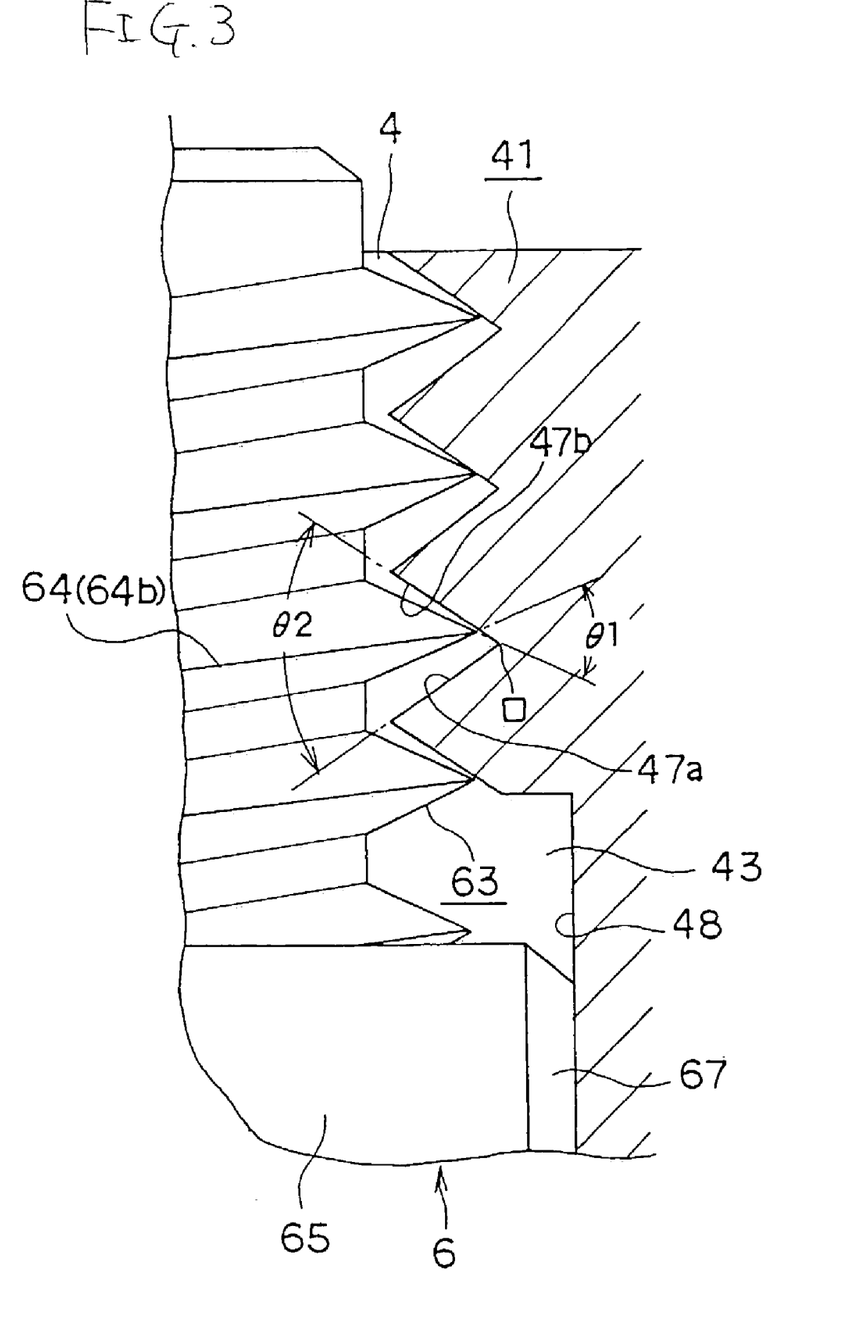
FIG. 3 is an enlarged explanatory diagram showing the engagement state in another embodiment.
Figure 4:
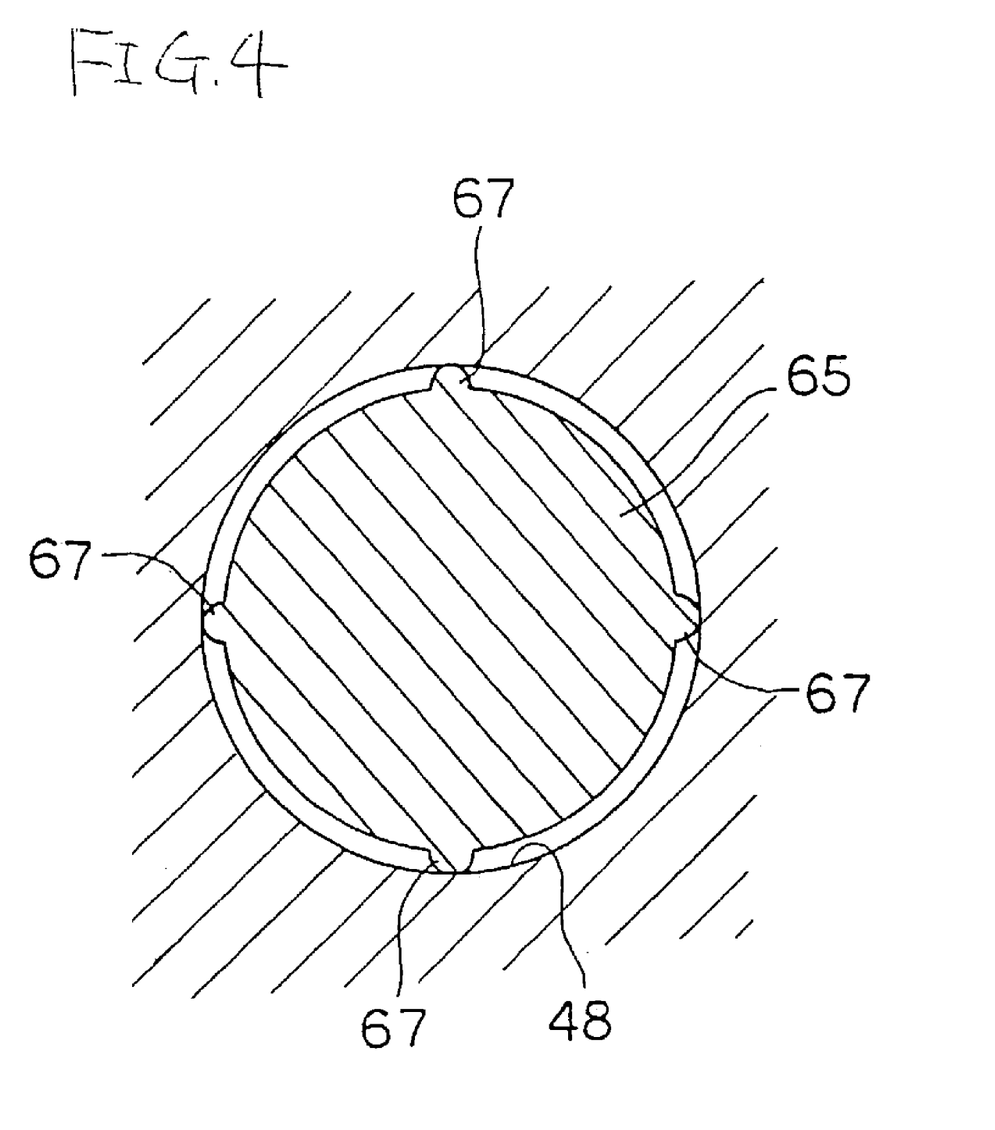
FIG. 4 is an explanatory sectional view taken along line IV—IV in FIG. 2.

FIG. 1A is a partially sectional front view of an optical pickup unit provided in an optical disc apparatus according to an embodiment of the invention. FIG. 2 is an enlarged explanatory diagram showing an engagement state between the main portion of an adjusting screw 6 and a screw hole 4 on a base body 1 side. FIG. 3 is an enlarged explanatory diagram showing the engagement state in another embodiment. FIG. 4 is an explanatory sectional view taken along line IV—-IV in FIG. 2.

Except for the shape and structure of the adjusting screw 6 and the screw hole 4, this embodiment has the same structure and operation with those of the conventional optical disc apparatus described with reference to FIG. 6. Thus, in FIGS. 1 to 4, portions identical to those of the conventional technique described above are referred to by the common symbols so as to omit the repetitive explanation thereof.

As shown in FIGS. 1A and 2, the adjusting screw 6 is same as the conventional one in a point that it has a male screw 63 and a shaft portion 65 adjacent thereto. However, as shown in FIG. 2, the each screw thread 64 of the male screw 63 of the adjusting screw 6 is divided into two half sections along the peripheral direction thereof in a manner that a screw thread 64a as one side section and a screw thread 64b as the other side section are slightly deviated positionally to each other in the axial line direction. In a state shown in the figure where the male screw 63 is screwed into the female screw 41 of the screw hole 4, the screw thread 64a of the one side section contacts with one slanted surface 47a of two slanted surfaces 47a, 47b which couple the valley bottom portion 45 of the female screw 41 with adjacent tip portions 46 to form V-shape slanted surfaces. The screw thread 64b of the other side section contacts with the other slanted surface 47b. The adjusting screw 6 is formed by synthetic resin molding. Thus, it is possible to easily manufacture the adjusting screw 6 provided with the male screw 63 in which the screw thread 64a of the one side section and the screw thread 64b of the other side section are deviated to each other. Further, when the positional deviation width between the screw thread 64a of the one side section and the screw thread 64b of the other side section is suitably set, each of the contact state between the screw thread 64a of the one side section and the one side slanted surface 47a and the contact state between the screw thread 64b of the other side section and the other side slanted surface 47b can be placed in an elastically pressed state or a non-elastically pressed state. One of the elastically pressed state and the non-elastically pressed state can be determined in view of operability at the time of adjusting the inclination angle of the objective lens by rotating the adjusting screw 6.

When the adjusting screw 6 has the aforesaid configuration, there arises no wobble in the axial direction between the male screw 63 of the adjusting screw 6 and the female screw 41 of the screw hole 4. Further, the frictional resistance due to the contact between the screw thread 64a of the one side section of the male screw 63 and the one side slanted surface 47a of the female screw 41 and the frictional resistance due to the contact between the screw thread 64b of the other side section of the male screw 63 and the other side slanted surface 47b of the female screw 41 serves to prevent the unexpected rotation of the adjusting screw 6. Furthermore, since the screw thread 64 is divided into two half sections along the peripheral direction thereof, the frictional resistance due to the contact between the screw thread 64a of the one side section of the male screw 63 and the one side slanted surface 47a of the female screw 41 is always balanced with the frictional resistance due to the contact between the screw thread 64b of the other side section of the male screw 63 and the other side slanted surface 47b of the female screw 41. Thus, the operability of the rotation at the time of adjusting the inclination using the adjusting screw 6 is not degraded.

In this embodiment, as shown in FIGS. 1A, 2 and 4, a receiving surface 48 formed by the peripheral surface (cylindrical surface) of a no-thread hole portion 43 is provided adjacent to the screw hole 4. A plurality of (four in this embodiment) rib-shaped projections 67 each elongated in the axial direction are integrally provided at plural portions of the shaft portion 65 of the adjusting screw 6 with the same angular interval along the peripheral direction of the shaft portion. In a state where the male screw 63 of the adjusting screw 6 is screwed into the female screw 41 of the screw hole 4, the shaft portion 65 fits into the cylindrical surface formed by the receiving surface 48 and the rib-shaped projections 67 are elastically pressed against the receiving surface 48 and brought into a press-in state. Thus, in addition to the aforesaid rotation prevention effect of the adjusting screw 6 due to the contact between the screw threads 64a, 64b of the male screw 63 and the slanted surfaces 47a, 47b of the female screw 41, such a rotation prevention effect due to the elastic pressing of the projections 67 against the receiving surface 48 acts, so that the unexpected rotation of the adjusting screw 6 can be surely prevented. Incidentally, when rotating the adjusting screw 6 at the time of adjusting the inclination angle, the adjusting screw 6 is effectively rotated by a rotation tool (not shown) engaged with a tool engaging portion 66 shown in FIGS. 1A and 1B, so that the rotation prevention effect of the adjusting screw 6 due to the contact between the screw threads 64a, 64b of the male screw 63 and the slanted surfaces 47a, 47b of the female screw 41 or the rotation prevention effect due to the elastic pressing of the projections 67 against the receiving surface 48 does not degrade the operability at the time of adjusting the inclination angle.

Figure 1B:
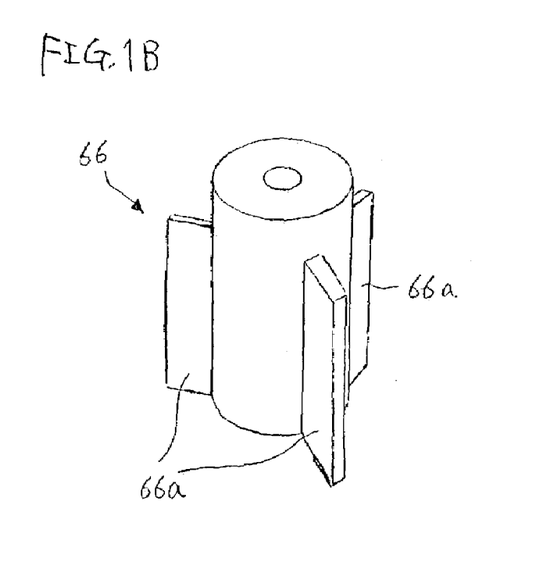
FIG. 1B is a perspective view of a tool engaging portion of the optical pickup unit.

As shown in FIG. 1B, which is viewed as arrow B in FIG. 1A, the tool engaging portion 66 has a plurality of (three in this embodiment) blades 66a protruding in radial directions with the same angular interval along the peripheral direction of the shaft portion.

In the embodiment shown in FIG. 2, the tip angle of the screw thread 64 is same as the open angle between the two slanted surfaces 47a, 47b of the female screw 41. Thus, each of the contact state between the screw thread 64a of the one side section of the male screw 63 and the one side slanted surface 47a of the screw and the contact state between the screw thread 64b of the other side section of the male screw 63 and the other side slanted surface 47b of the female screw 41 is in a surface contact state. As a result, even when the contact states between the screw threads 64a, 64b and the slanted surfaces 47a, 47b are in the non-elastically pressed state, the rotation prevention effect for preventing the unexpected rotation of the adjusting screw 6 is not degraded. However, the contact states may become an elastically pressed state due to the size error etc. at the time of manufacturing. If such a phenomenon occurs, even if the rotation prevention effect for preventing the unexpected rotation of the adjusting screw 6 is not degraded, a large force is required when rotating the adjusting screw 6 at the time of adjusting the inclination angle and so the rotation operability of the adjusting screw may be degraded.

An embodiment will be described which can perform the rotation prevention effect for preventing the unexpected rotation of the adjusting screw 6 and realize the rotation operability of the adjusting screw 6 at the time of adjusting the inclination angle, even when the size error etc. occurs at the time of manufacturing.

As shown in FIG. 3, the tip angle θ1 of the screw thread 64 is made smaller than the open angle θ2 between the two slanted surfaces 47a, 47b of the female screw 41. In a state where the male screw 63 is screwed into the female screw 41, as shown in FIG. 3, as to the screw thread 64b of the other side section, only the tip portion of the screw thread 64b is arranged to elastically press against the other side slanted surface 47b. According to this embodiment, even if there is a size error within a tolerance in each of the pitch of the screw thread 64 of the male screw 63 and the pitch of the valley-shaped groove 47 of the female screw 41, these size errors can be absorbed by the bending operation of the tip portion of the screw thread 64b. Thus, the rotation prevention effect for preventing the unexpected rotation of the adjusting screw 6 and the rotation operability of the adjusting screw 6 at the time of adjusting the inclination angle can be secured.

Although FIG. 3 shows only the screw thread 64b of the other side section, as to the thread of the one side section, only the tip portion of the thread of the one side section is arranged to elastically press against the one side slanted surface 47a. Thus, even if there is a size error within a tolerance in each of the pitch of the screw thread 64 of the male screw 63 and the pitch of the valley-shaped groove 47 of the female screw 41, these size errors can be absorbed by the bending of the tip portion of the thread of the one side section. Thus, each of the rotation prevention effect for preventing the unexpected rotation of the adjusting screw 6 and the rotation operability of the adjusting screw 6 at the time of adjusting the inclination angle can be secured.

As described above, according to the invention, only the shape of the screw thread of the male screw of the adjusting screw is modified in the optical disc apparatus. According to such a modification, when the inclination angle of the objective lens is performed by rotating the adjusting screw, such a phenomenon can be prevented that the adjustment screw unexpectedly rotates after the inclination angle adjustment thereby to cause the deviation of the angle. Thus, an inconvenience due to the adjustment deviation after the inclination angle adjustment, such a phenomenon can be prevented from occurring that the recording or reproducing efficiency of the optical pickup unit is degraded thereby to distort an image. Further, since any excessive parts are not required unlike the prior arts 1, 3 and 4, the cost of the apparatus does not increase.

What is claimed is:

1. An optical disc apparatus comprising:
a guide shaft attached to a chassis;
a base body being guided by a guide shaft to reciprocally move along a radial direction of a disc, the base body having a screw hole positioned away from the guide shaft;
a lens holding member mounted on the base body and having an objective lens that opposes to a surface of the disc;
an adjusting screw made of synthetic resin and having a male screw and a slidable portion concentrically formed by an annular groove portion; and
a rail portion fitting with the slidable portion and provided in the chassis in parallel to the guide shaft,
wherein the base body swings around an axis line of the guide shaft to perform adjustment of an inclination angle of the objective lens when the adjusting screw being screwed into the screw hole is rotated,
the male screw of the adjusting screw is divided into two half sections along a peripheral direction thereof in a manner that a screw thread as one side section and a screw thread as the other side section are slightly deviated positionally to each other in an axial line direction, a tip angle of the screw thread is made smaller than an open angle between two slanted surfaces which couple a valley bottom portion of a female screw of the screw hole with adjacent tip portions of the female screw, and
a tip portion of the screw thread of the one side section elastically presses against one slanted surface of the two slanted surfaces and a tip portion of the screw thread of the other side section elastically presses against the other slanted surface of the two slanted surfaces.

2. An optical disc apparatus comprising:
a base body reciprocally movable along a radial direction of a disc, the base body having a screw hole;
a lens holding member mounted on the base body and having an objective lens that opposes to a surface of the disc; and
an adjusting screw having a male screw,
wherein the base body swings around an axis line of the guide shaft to perform adjustment of an inclination angle of the objective lens when the adjusting screw being screwed into the screw hole is rotated,
the male screw of the adjusting screw is divided into two sections along a peripheral direction thereof in a manner that a screw thread as one side section and a screw thread as the other side section are slightly deviated positionally to each other in an axial line direction, and
a tip portion of the screw thread of the one side section elastically presses against one slanted surface of two slanted surfaces, which couple a valley bottom portion of a female screw of the screw hole with adjacent tip portions of the female screw, and a tip portion of the screw thread of the other side section elastically presses against the other slanted surface of the two slanted surfaces.

3. The optical disc apparatus according to claim 2, wherein each of screw threads of the adjusting screw is divided into two half sections along a peripheral direction thereof.

4. The optical disc apparatus according to claim 2, wherein the adjusting screw is formed by synthetic resin molding.

5. The optical disc apparatus according to claim 4, wherein a tip angle of the screw thread of the male screw of the adjusting screw is made smaller than an open angle between the two slanted surfaces, and a tip portion of the screw thread of the one side section elastically presses against one slanted surface of the two slanted surfaces and a tip portion of the screw thread of the other side section elastically presses against the other slanted surface of the two slanted surfaces.

6. The optical disc apparatus according to claim 4, wherein a receiving surface formed by a cylindrical surface is provided at a portion adjacent to the screw hole, and a plurality of projections are disposed at plural portions adjacent to the male screw of the adjusting screw along a peripheral direction thereof so that the projections elastically press against the receiving surface to prevent rotation of the adjusting screw.

7. The optical disc apparatus according to claim 2, wherein the base body is attached to a guide shaft in a relatively slidable and rotatable manner, the guide shaft being attached to a chassis for guiding reciprocal movements of the base body,
the screw hole is positioned away from the guide shaft, and
a slidable portion is provided on the adjusting screw in a manner that the slidable portion is supported so as to be slidable by a rail portion which is provided in the chassis in parallel to the guide shaft.

* * * * *